R. H. LECKY.
TRUCK FOR STREET RAILWAYS.
No. 42,202.
Patented Apr. 5, 1864.
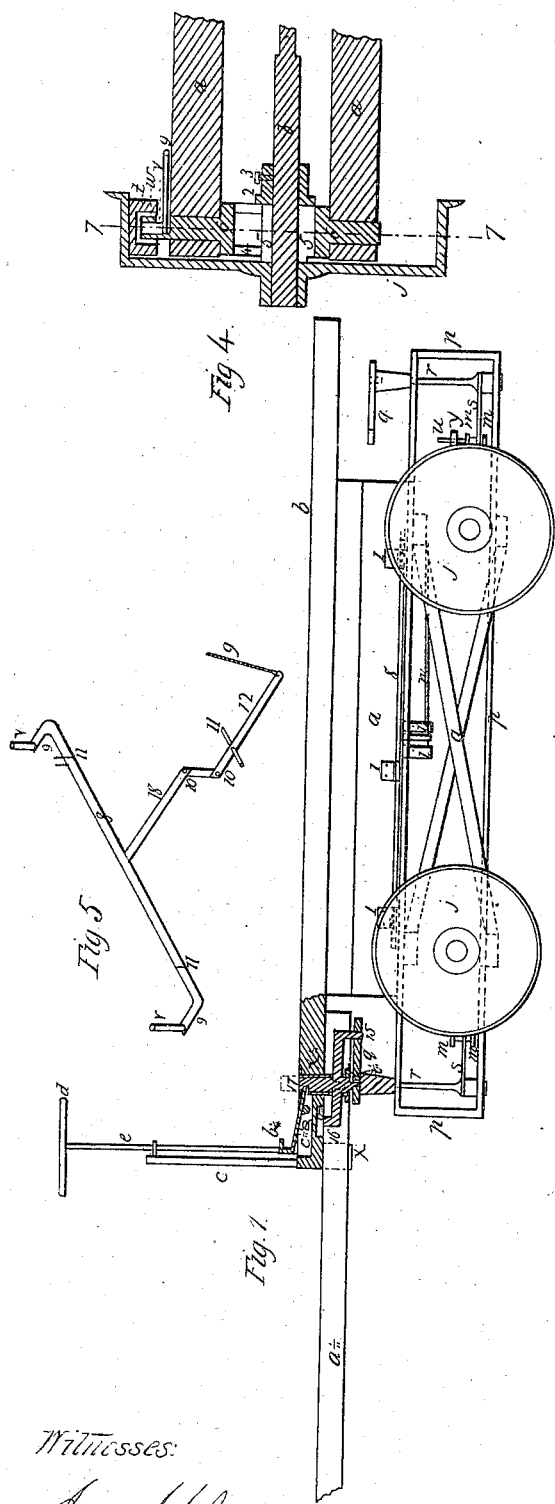
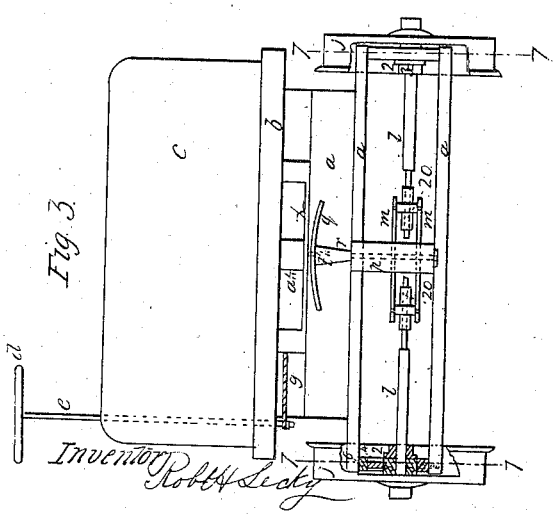
Witnesses:
James J. Johnston
Alexander Hay
Inventor
Rob¹ H. Lecky

UNITED STATES PATENT OFFICE.

ROBERT H. LECKY, OF McCLURE, PENNSYLVANIA.

IMPROVEMENT IN TRUCKS FOR STREET-RAILWAYS.

Specification forming part of Letters Patent No. 42,202, dated April 5, 1864.

*To all whom it may concern:*

Be it known that I, ROBERT H. LECKY, of McClure township, in the county of Allegheny and State of Pennsylvania, have invented certain new and useful Improvements in Trucks for Street-Cars; and I do hereby declare that the following is a full and exact description thereof, reference being had to the accompanying drawings, and to the letters and figures of reference marked thereon.

The nature of my invention consists in an arrangement for adjusting the position of the wheels to suit the curves of their track, the whole being constructed, arranged, and operating in the manner hereinafter described.

In the accompanying drawings, Figure 1 represents a side view of the truck and the bottom of the car. Fig. 2 represents a bottom view of the truck. Fig. 3 represents an end view of the truck. Fig. 4 represents a section of the frame, wheel, bearing, and brake. Fig. 5 represents the arrangement of the levers for the brakes for one side of the truck.

In the drawings, $a$ represents the frame of the truck.

$b$ represents the bottom of the car, which is made so that it can swing around on the truck.

The bottom and its attachment are constructed, arranged, and operated in the ordinary way, with the exception of the means used for holding the bottom in the desired position.

$a'$ represents the tongue, which is secured to the bottom of the car by means of the flanged tube $x'$, in which is placed the "catch" 17, which is furnished with tongues or points 15, $t'$, and 16. The flanged tube 17 has a slot in the lower end of it for the purpose of allowing the arms of the catch to move up and down in it when unshipping the catch from the guide $q$. In the upper side of the bottom $b$ is a recess, in which is placed a spring, $c'$, and a lever, $b'$. The spring $c'$ is used for the purpose of holding the lever in the desired position. One end of the lever $b'$ is placed in a recess made in the catch 17, and is used for unshipping the catch 17 from the guide $q$, which is placed on the upper end of the shaft $r$, which is held in the proper position by means of the frame $p$, which is secured to the frame $a$ of the truck. The guide $q$ is made in the form of a segment of a circle, as represented in Fig. 3. To the shaft $r$ is attached a lever, $s$, which is attached to a link, $t$, one end of which is attached to the disks $m$, which are secured to the frame $p$ by means of the bolt 14, which serves as the axis of the disks, between which are placed the swivel-bearings 20 for the inner ends of the axles $l$ of wheels $j$. It will be observed that the axis of the swivel bearings 20 are in a line with and perpendicular to the axles $l$, outside of which are placed the axis of the disks, $m$, for the purpose of bringing the axles and wheels resting on the outer and inner rails of the curve into a proper position for adjusting them to the radius of the curves of their tracks.

6 are swivel-bearings the axes of which are placed in the transverse timbers of the frame $a$ and central to the periphery of the wheels $j$, (as indicated by the dotted lines 7,) for the purpose of turning the wheels sidewise without any back or forword motion other than that imparted by the drawing or driving power.

5 are the journal-boxes of the axles $l$. 4 are springs.

The journal-boxes 5 and the springs 4 are placed in the swivel-bearings 6.

The axles $l$ are held in their proper position to the swivel-bearings 6 by means of collars 2, which are secured on axles $l$ by means of set screws 3. The upper end of the swivel-bearings 6 are made hollow for the purpose of receiving the plungers $v$.

$z$ are the brakes, in which are placed cups $w$, which are fitted to axis of the swivel-bearings 6. By means of the cups $w$ the brakes are allowed to adjust themselves on the ends of the swivel-bearings to the various positions assumed by the wheels. The disks at each end of the truck, and the various parts connected thereto, are united by a connecting-rod, 19, as represented in Fig. 2. To one of the transverse timbers of the truck are attached springs $y$, between which is placed a pin, $u$, which is secured to the disk $m$. (See Figs. 1 and 2.) These springs and pin are used for the purpose of holding the wheels $j$ in line with each other, as represented in Fig. 2.

The levers for operating the brakes are made in the form represented in Fig. 5, and secured to the truck by means of the pieces marked 1.

The points marked 11 represent fulcrums of the levers.

It will be observed that Fig. 5 represents an arrangement of levers for one side of the truck. A duplicate of these levers are used for the other side of the truck.

To the levers 12 are attached a rope or chain, $g$, which is used and operated in the ordinary manner of operating brakes, which manner is represented by the parts marked $d$, $e$, $f$, and $h$, secured to the dash-board $c$ and the bottom $b$ of the car body. The fulcrums of the parts 12 of the levers for the brakes are placed in the pieces $i$. The brakes are thrown off from the wheels by their weight, and by springs $n$, which are secured to a transverse piece of the truck, the front ends of the springs $n$ bear on the part marked 18 of the levers. $o$ represents braces.

It will be observed by reference to Fig. 4 that the points of arms 9 of the levers for the brakes are placed under the plungers $v$, openings being made in the axis of the bearings 6 for that purpose.

I wish it clearly understood that I do not confine myself to any particular form or size of the various parts herein described and represented, but the arrangement of the parts must be substantially the same as herein described and represented.

Having thus described the construction of the truck and the various parts attached thereto, I will now proceed to describe the operation of my improvement, which is as follows:

When I desire to throw the brakes up against the inner surface of the wheels, I wind up the rope $g$ by means of the wheel $d$ and shaft $e$, which will draw up the long end of the levers 12, which will throw down the part marked 18 and throw up the points of arms 9, which will raise the plungers $v$, which will press the brakes $z$ against the wheels. When turning a curve, the tongue $a'$ will (by turning the horses attached to it in a line with the curve) cause the tongue 15 of the catch 17 to turn the guide on the shaft $r$, which operates the lever $s$, which will turn the disks $m$, by means of the link $t$ and connecting-rod 19 in the desired direction for adjusting the wheels $j$ and their axles $l$ to the radius of the curves of their tracks. When I desire to turn the body around so that the dash-board will be at the opposite end of the truck, I press down the lever $b'$, which will raise up the catch 17, which will release the tongues 15 and $t'$ from the guide $q$ and cause the tongue 16 to enter the recess $o'$ in the under side of the bottom, which will hold the tongue $a'$ and the tongues 15 and $t'$ of the catch 17 in a straight line with the body of the car and the notches made in the guide $q$ for the reception of the tongues 15 and $t'$.

Having thus described the nature, construction, and operation of my improvement, what I claim as of my invention is—

1. The combination of the swivel-bearings 6 and 20 when used in connection with the axles $l$, wheels $j$, disks $m$, connecting-rod 19, levers $s$ and $t$, and shaft $r$, constructed, arranged, and operating substantially as herein described, and for the purpose set forth.

2. Securing the tongue $a'$ to the bottom $b$ by means of the flanged tube $x'$ and support $x$, as herein described, and for the purpose set forth.

3. The use of the catch 17 and guide $q$, when used in combination with the tongue $a'$, flanged tube $x'$, bottom $b$, and lever $b'$, arranged, constructed, and operating substantially as herein described, and for the purpose set forth.

4. The arrangement of the brakes $z$, cups $w$, plungers $v$, and levers 9, 8, 18, and 12, arranged, constructed, and operating substantially as herein described, and for the purpose set forth.

ROBERT H. LECKY.

Witnesses:
JAMES J. JOHNSTON,
ALEXANDER HAYS.